(12) United States Patent
Larsson et al.

(10) Patent No.: US 8,780,789 B2
(45) Date of Patent: Jul. 15, 2014

(54) METHODS AND NODES RELATED TO CODING OF CHANNEL STATUS INFORMATION (CSI) PAYLOAD

(75) Inventors: Daniel Larsson, Solna (SE); Robert Baldemair, Solna (SE); Jung-Fu Cheng, Fremont, CA (US); Dirk Gerstenberger, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 13/384,777

(22) PCT Filed: Dec. 15, 2011

(86) PCT No.: PCT/SE2011/051514
§ 371 (c)(1),
(2), (4) Date: Jan. 19, 2012

(87) PCT Pub. No.: WO2012/112099
PCT Pub. Date: Aug. 23, 2012

(65) Prior Publication Data
US 2012/0207108 A1      Aug. 16, 2012

Related U.S. Application Data

(60) Provisional application No. 61/443,519, filed on Feb. 16, 2011.

(51) Int. Cl.
*H04B 7/216* (2006.01)
*H04L 25/03* (2006.01)
*H04W 52/26* (2009.01)
*H04W 40/12* (2009.01)

(52) U.S. Cl.
CPC ....... *H04L 25/03898* (2013.01); *H04W 52/262* (2013.01); *H04W 40/12* (2013.01)
USPC ........................................ 370/320

(58) Field of Classification Search
CPC ............... H04B 7/0632; H04L 1/0606; H04L 25/03949; H04L 25/03898; H04W 40/12; H04W 52/241; H04W 52/262
USPC .......................................... 370/320
See application file for complete search history.

(56) References Cited

U.S. PATENT DOCUMENTS 7,912,133 B2 *   3/2011   Cheon et al. ............. 375/240.27
8,140,944 B2 *   3/2012   Chen et al. ................... 714/776

(Continued)

OTHER PUBLICATIONS

International Search Report, PCT/SE2011/051514, Mar. 5, 2012.

(Continued)

*Primary Examiner* — Phuc Tran
(74) *Attorney, Agent, or Firm* — Myers Bigel Sibley & Sajovec

(57) ABSTRACT

Methods, for use in a communications system, for transmitting information that applies a method for channel coding the CQI/PMI information, wherein a turbo coding method is applied when the size of the CQI/PMI information is above a first threshold value. The methods further include setting, based on the method applied for the channel coding, an offset value indicative of the difference in code rate between the code rate of the CQI/PMI information and the assigned code rate of the UL-SCH data information on the PUSCH. The methods also include determining, based on the offset value, the number of coded bits to be used for transmission of the CQI/PMI information, and transmitting the CQI/PMI information to a radio access network node on resources assigned based on the determined number of coded bits.

16 Claims, 11 Drawing Sheets

(56) References Cited

U.S. PATENT DOCUMENTS

| | | | | |
|---|---|---|---|---|
| 8,406,148 | B2* | 3/2013 | Cheon et al. | 370/252 |
| 8,437,705 | B2* | 5/2013 | Khoshnevis et al. | 455/69 |
| 2010/0098012 | A1* | 4/2010 | Bala et al. | 370/329 |
| 2012/0093139 | A1* | 4/2012 | Hooli et al. | 370/337 |

OTHER PUBLICATIONS

Written Opinion of the international Searching Authority, PCT/SE2011/051514, Mar. 5, 2012.

Ericsson et al., "Remaining details of CSI coding and resource mapping on PUSCH," 3GPP Draft; RI-110635, 3$^{rd}$ Generation Partnership Project (3GPP), Mobile Competence Centre; 650, Route Des Luciales; F-06921 Sophia-Antipolis CEDEX; France, vol. RAN WG1, no. Taipei, Taiwan, Feb. 15, 2011, 5 pages.

"3$^{rd}$ Generation Partnership Project; Technical Specification Group Radio Access Network; Evolved Universal Terrestrial Radio Access (E-UTRA); Multiplexing and channel coding (Release 10)," 3GPP Standard; 3GPP TS 36.212, 3$^{rd}$ Generation Partnership Project (3GPP), Mobile Competence Centre, 650, Route Des Lucioles; F-06921 Sophia-Antipolis CEDEX; France, No. V10.0.09, Dec. 22, 2010, 72 pages.

Huawai et al., "Coding and resource mapping for UCI on PUSCH," 3GPP Draft; R1-110009, 3$^{rd}$ Generation Partnership Project (3GPP), Mobile Competence Centre; 650, Route Des Lucioles; F-06921 Sophia-Antipolix CEDEX; France, vol. RAN WG1, no. Dublin, Ireland, Jan. 11, 2011, 5 pages.

* cited by examiner

Aggregated bandwidth

METHODS AND NODES RELATED TO CODING OF CHANNEL STATUS INFORMATION (CSI) PAYLOAD

CROSS-REFERENCE TO RELATED APPLICATIONS

This application is a 35 U.S.C. §371 national stage application of PCT International Application No. PCT/SE2011/051514, filed on Dec. 15, 2011, and claims priority to U.S. Provisional Patent Application No. 61/443,519, filed Feb. 16, 2011, the disclosures and content of which are incorporated by reference herein as if set forth in their entirety.

FIELD

The disclosure relates to channel coding of Channel Status Information (CSI) payload. More particularly, the disclosure relates to transmission of information relating to CSI multiplexed with data information on a channel.

BACKGROUND

The Universal Mobile Telecommunication System (UMTS) is one of the third generation mobile communication technologies designed to succeed the Global System for Mobile communications (GSM). Long Term Evolution (LTE) is a project within the 3$^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) 150 is wirelessly connected to a base station (BS) 110a commonly referred to as an evolved NodeB (eNodeB), as illustrated in FIG. 1. In E-UTRAN, the eNodeBs 110a-c are directly connected to a core network (CN) 190.

The LTE Rel-8 standard has been standardized, supporting bandwidths up to 20 MHz. However, in order to meet the International Mobile Telecommunications (IMT) advanced requirements, 3GPP has initiated work on LTE Rel-10. One of the parts of LTE Rel-10 is to support bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal or UE. Each such carrier can be referred to as a component carrier or a cell. In particular for early LTE Rel-10 deployments it can be expected that there will be a smaller number of LTE Rel-10-capable UEs compared to many LTE legacy UEs, i.e. UEs of earlier LTE releases. Therefore, it is necessary to assure an efficient use of a wide carrier also for legacy UEs, i.e. that it is possible to implement carriers where legacy UEs can be scheduled in all parts of the wideband LTE Rel-10 carrier. The straightforward way to obtain this would be by means of carrier aggregation, which is schematically illustrated in FIG. 2, where five component carriers or cells 210, each of 20 MHz bandwidth, have been aggregated together to form an aggregated bandwidth of 100 MHz. Carrier aggregation implies that an LTE Rel-10 UE can receive or transmit on multiple component carriers or cells, where the component carriers could have, or at least have the possibility to have, the same structure as a Rel-8 carrier.

LTE uses Hybrid Automatic Repeat Request (HARQ). After receiving downlink data in a sub frame, the UE attempts to decode it and reports to the eNodeB whether the decoding was successful or not. The acknowledgment is sent in the form of an ACK when decoding is successful, and in the form of a NACK when the decoding is unsuccessful. In case of an unsuccessful decoding attempt, the eNodeB may retransmit the data that was unsuccessfully decoded.

Uplink control signaling from the UE to the eNodeB comprises, in addition to HARQ acknowledgements for received downlink data:

Scheduling requests, indicating that a UE needs uplink resources for uplink data transmissions; and Reporting of information related to the downlink channel conditions, typically referred to as Channel Status Information (CSI) reporting, used as assistance for the eNodeB downlink scheduling. Such CSI reports may comprise Channel Quality Indicators (CQI), Precoding Matrix Indicators (PMI) and Rank Indicators (RI).

The uplink control information is transmitted in uplink resources specifically assigned for uplink control on a Physical Uplink Control Channel (PUCCH), if the UE has not already been assigned an uplink resource for data transmission. On the other hand, if the mobile terminal or UE has been assigned an uplink resource for data transmission and at the same time instance has control information to transmit, the UE will typically transmit the control information together with the data on the Uplink Shared Channel (UL-SCH). FIG. 3 illustrates schematically the position of data and the different control information types in one uplink sub frame from one UE, when using normal cyclic prefix. As illustrated in FIG. 3, CQI and PMI are jointly coded and use the same set of resource elements. Scheduling requests are not transmitted together with uplink data. Instead a buffer status report is transmitted jointly coded with the data if such a status report has been triggered. CQI/PMI may be requested by bits in the uplink grant. The CQI/PMI format used for requested reports is often frequency selective, while periodic reports configured on PUCCH is smaller but often non-frequency selective.

The different control types are differently multiplexed with data. The amount of resources used for CQI/PMI and RI is taken into account when data is placed in the sub frame, so that data is only placed at the positions not allocated by CQI/PMI and RI. The HARQ ACK/NACK then overwrites the data and possibly also CQI/PMI.

The amount of data that is transmitted within assigned resource blocks in uplink is indicated by the number of resource blocks assigned and a Modulation and Coding Scheme (MCS), based on a MCS table 40 as illustrated in FIG. 4. Each point of the table indicates the transport block size for a certain combination of the number of scheduled resources and the modulation and coding scheme. Quadrature phase-shift keying (QPSK) modulation, 16 Quadrature Amplitude Modulation (16QAM), and 64QAM may be used in LTE for UL-SCH transmission. Transport block sizes, such as the ones corresponding e.g. to the points 41, 42 and 43 indicated in the enlarged circle, may be the same although they correspond to different numbers of resource blocks. One of the principles behind this design is that the amount of resource blocks assigned to the uplink transmission should be independent from the set of possible code rates, i.e. the same code rates for data is available independently from the number of resource blocks assigned.

The amount of control information that is transmitted together with data is determined by the code rate of data, without taking the amount of control information into account. Since the data on Physical Uplink Shared Channel (PUSCH) is protected by the HARQ protocol, it is usually operated at a higher error rate than the error rate required for the HARQ ACK/NAK, CQI/PMI and RI. Therefore it is since LTE Rel-8 possible to configure an offset so that control information is given a lower code rate than data by a certain number of dBs. This offset is referred to as the Beta offset. The exact principle of how to use the Beta offset is defined in section 5.2.2.6 of the 3GPP TS 36.212, v.10.0.0, and in section 8.6.3 of the 3GPP TS 36.213, v.10.0.1.

It is possible to send reports regarding the downlink channel condition on PUSCH also without data, indicated by a special point in the MCS table. No Beta offset is used in this case. If other control information is multiplexed with such a transmission the code rate of that control information is dependent on the code rate of CQI/PMI instead of on the code rate of data.

The CQI/PMI is encoded with the Reed-Muller (RM) encoder if the number of information bits is below twelve. If the number of information bits is above eleven, the CQI/PMI is encoded with the tail-biting convolutional code instead.

If the UE aggregates several downlink cells, it can transmit an aperiodic CSI report for several downlink cells. The CSI reports will only be transmitted on a single uplink component carrier. In case one or more aperiodic CSI report is transmitted, all the reports will be transmitted on PUSCH. They can then be multiplexed together with data or they can be sent on a PUSCH transmission without data as described previously.

The eNodeB may trigger the UE to report aperiodic CSI reports by using a two bit trigger in the uplink grant. In Rel-10 this triggering mechanism has been extended so that it includes a possibility to trigger an aperiodic CSI report for the serving cell, an aperiodic CSI report for each of a first set of serving cells configured by higher layers, and an aperiodic CSI report for each of a second set of serving cells configured by higher layers, instead of only triggering an aperiodic CSI for the corresponding downlink (DL) cell. In total there are thus three possible aperiodic CSI report triggering options. The two cell sets for aperiodic CSI report triggering may include all from one to all configured downlink cells. However, the actual reporting is limited to the activated cells in the set. A detailed description of the triggering of aperiodic CSI reports is available in section 7.2.1 of the 3GPP TS 36.213, v.10.0.1.

For Rel-10 the CQI/PMI reporting payload will grow in size, since it will be possible to report aperiodic CSI reports for all activated component carriers or cells on a single PUSCH transmission. In Rel-8/9 the aperiodic CSI, which may comprise up to 72 bits payload, is coded with a convolutional code. However, for larger CQI/PMI payload sizes, the convolutional coding may not be so efficient. Furthermore, it is possible for the eNodeB to change between triggering aperiodic CSI for many downlink cells and triggering for only a single downlink cell on a sub frame basis, so the CQI/PMI payload size will vary from sub frame to sub frame. There is therefore a need for improving CQI/PMI transmission when the CQI/PMI payload sizes increase.

SUMMARY

It is therefore an object to address some of the problems outlined above, and to provide a resource efficient CQI/PMI transmission. This object and others are achieved by the methods, the UE, and the RAN node according to the independent claims, and by the embodiments according to the dependent claims.

In accordance with a first embodiment, a method for use in a UE of a communications system, for transmitting information relating to CQI and PMI multiplexed with UL-SCH data information on a PUSCH is provided. The method comprises applying a method for channel coding the CQI/PMI information, wherein a turbo coding method is applied when the size of the CQI/PMI information is above a first threshold value. The method further comprises setting, based on the method applied for the channel coding, an offset value indicative of the difference in code rate between the code rate of the CQI/PMI information and the assigned code rate of the UL-SCH data information on the PUSCH. The method also comprises determining, based on the offset value, the number of coded bits to be used for transmission of the CQI/PMI information, and transmitting the CQI/PMI information to a radio access network node on resources assigned based on the determined number of coded bits.

In accordance with a second embodiment, a method for use in a Radio Access Network (RAN) node of a communications system, for receiving CQI and PMI information multiplexed with UL-SCH data information on a PUSCH is provided. The method comprises receiving the CQI/PMI information multiplexed with the UL-SCH data information on the PUSCH from a UE. The method also comprises decoding the received CQI/PMI information based on an offset value indicative of a difference in code rate between the code rate of the CQI/PMI information and the assigned code rate of the UL-SCH data information on the PUSCH.

In accordance with a third embodiment, a UE for a communications system, configured to transmit information relating to CQI and PMI multiplexed with UL-SCH data information on a PUSCH, is provided. The UE comprises a processing unit configured to apply a method for channel coding the CQI/PMI information, wherein a turbo coding method is applied when the size of the CQI/PMI information is above a first threshold value. The processing unit is further configured to set, based on the method applied for the channel coding, an offset value indicative of the difference in code rate between the code rate of the CQI/PMI information and the assigned code rate of the UL-SCH data information on the PUSCH. The processing unit is also configured to determine, based on the offset value, the number of coded bits to be used for transmission of the CQI/PMI information. The UE further comprises a transmitter for transmitting the CQI/PMI information to a RAN node on resources assigned based on the determined number of coded bits.

In accordance with a fourth embodiment, a RAN node of a communications system, configured to receive CQI and PMI information multiplexed with UL-SCH data information on a PUSCH, is provided. The RAN node comprises a receiver for receiving the CQI/PMI information multiplexed with the data information on the PUSCH from a UE. The RAN node also comprises a processing unit configured to decode the received CQI/PMI information based on an offset value indicative of a difference in code rate between the code rate of the CQI/PMI information and the assigned code rate of the UL-SCH data information on the PUSCH.

An advantage of embodiments is that a more accurate resource handling of CQI/PMI will result in lower overhead for CQI/PMI feedback and thus more resources available for data transmission on PUSCH. This will enhance the end-user experience of the offered service.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of methods and nodes, they may also be embodied in a computer program product as well as in a system comprising a computer processor and a memory coupled to the processor, wherein the memory is encoded with one or more programs that may perform the functions disclosed herein.

Figure 1:
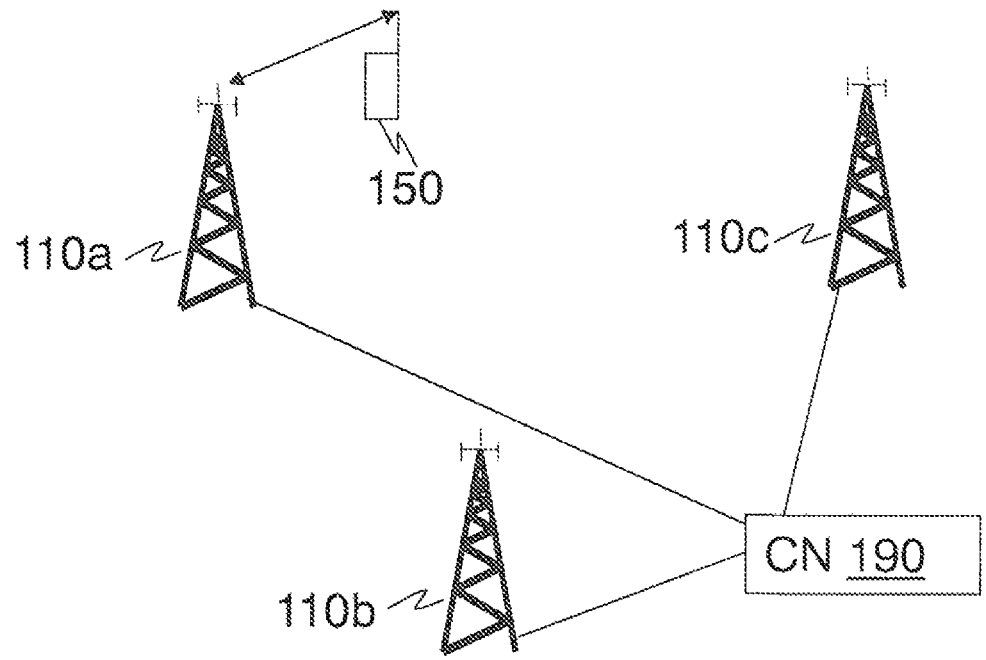
FIG. 1 is a schematic illustration of a conventional wireless communications system.
Figure 2:
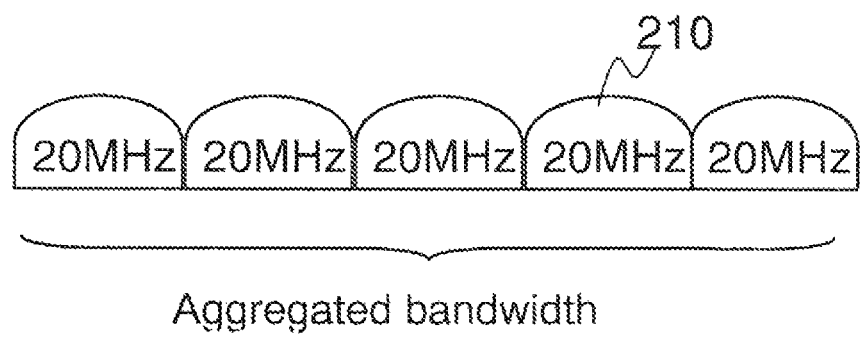
FIG. 2 is a schematic illustration of carrier aggregation.
Figure 3:
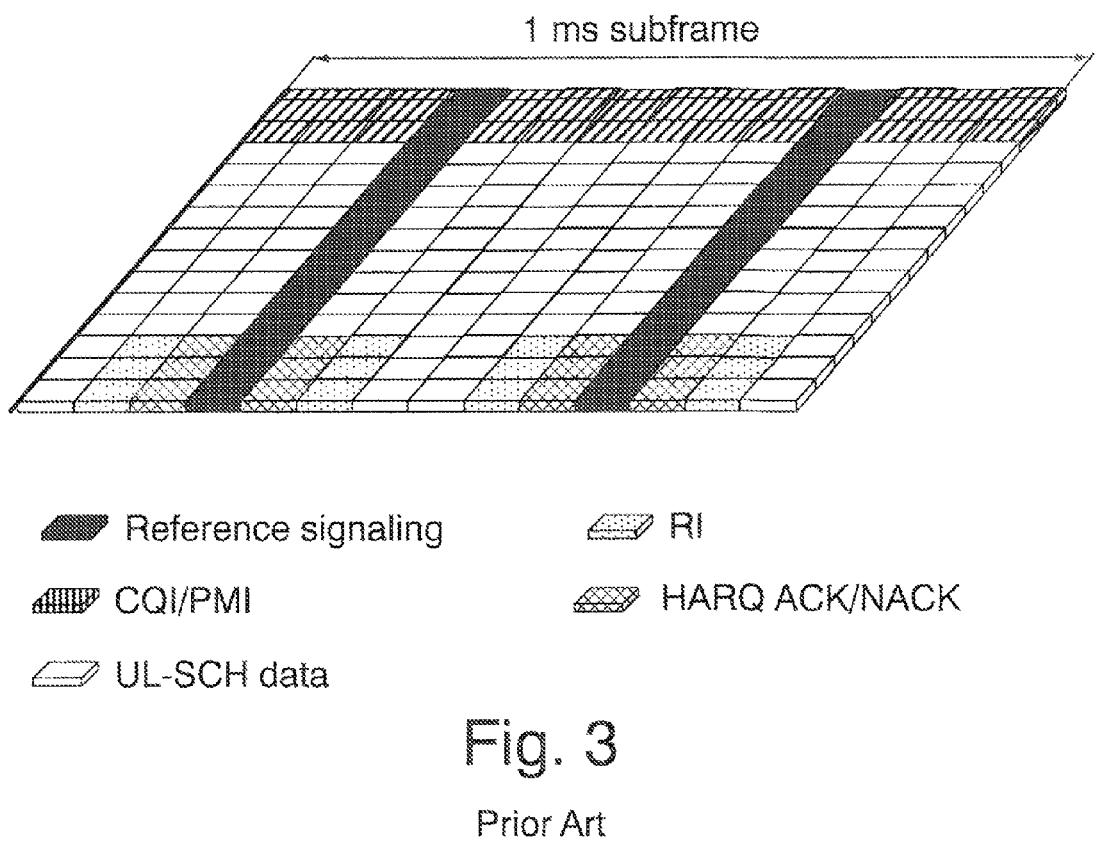
FIG. 3 is a schematic illustration of the position of data and the different control information types in an uplink sub frame.
Figure 4:
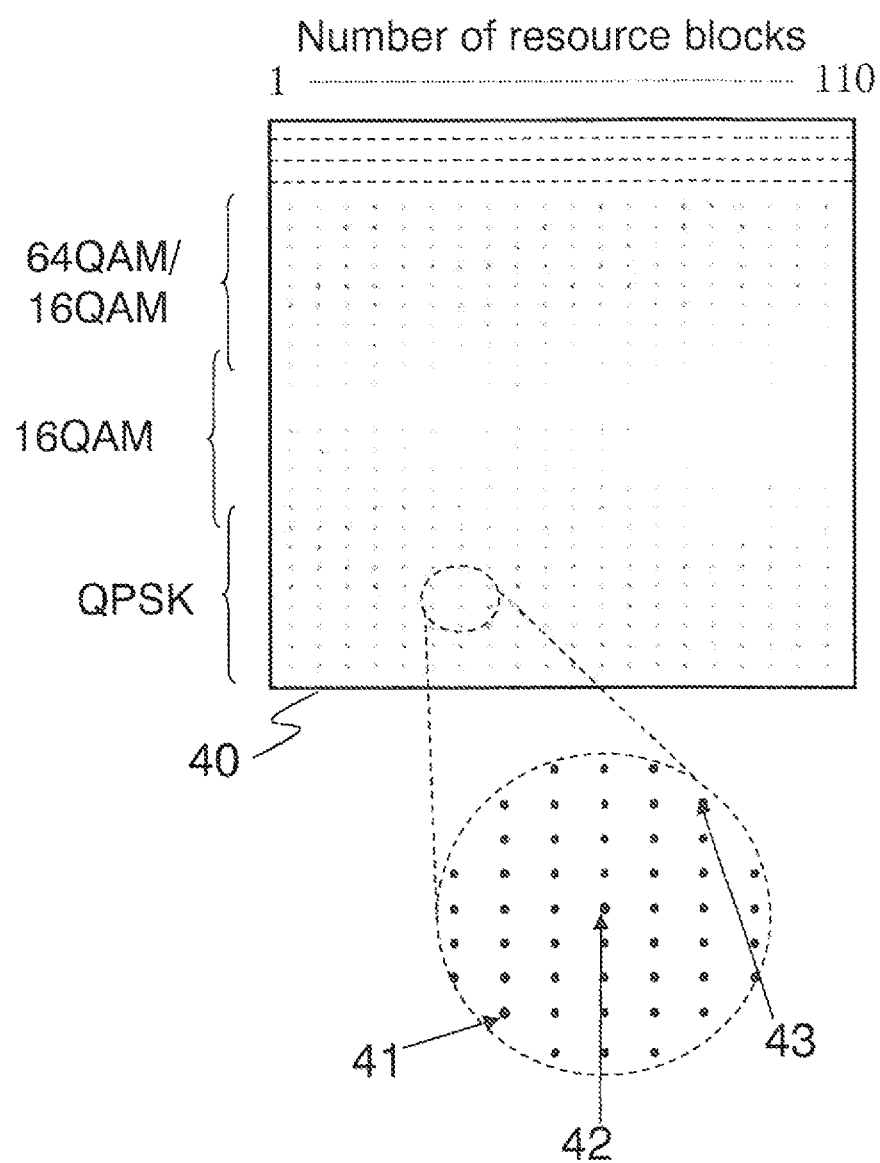
FIG. 4 is a schematic illustration of how the transport block size is determined based on a modulation and coding scheme table.
Figure 5A:
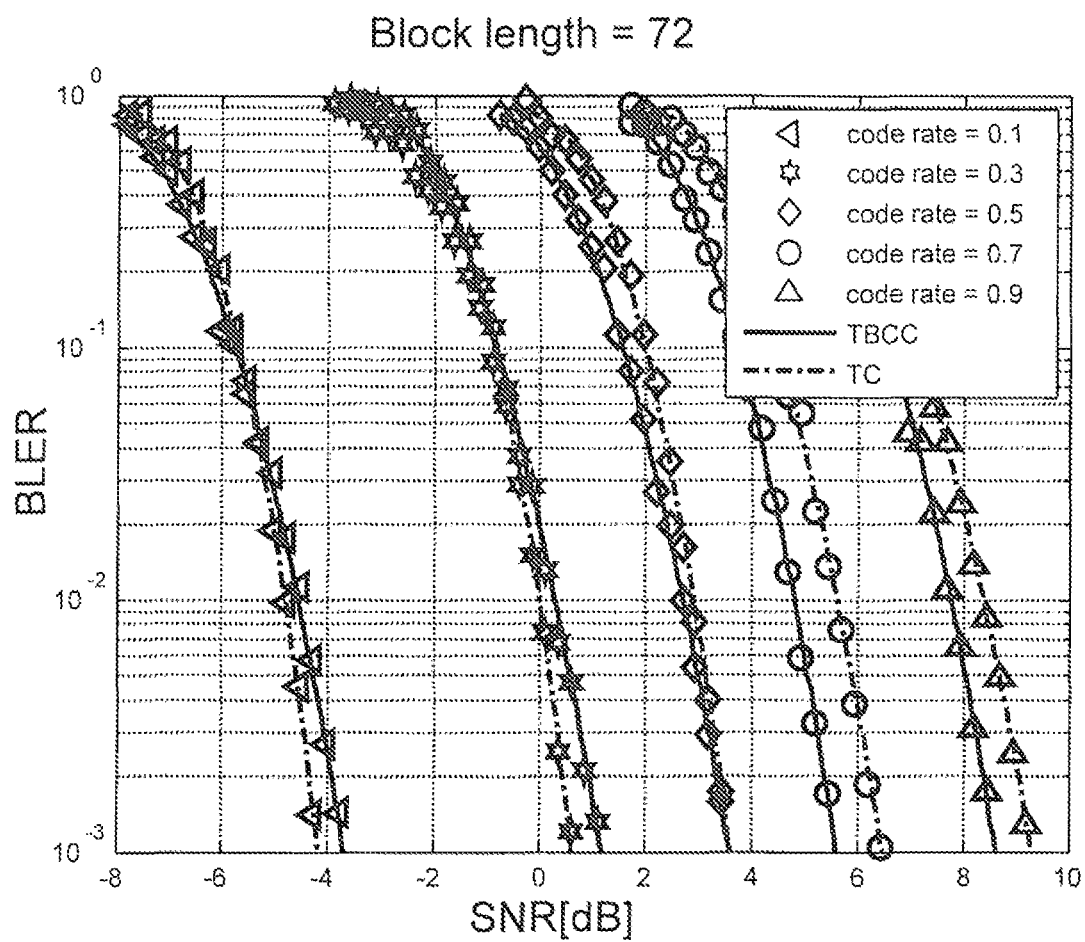
FIGS. 5a-e are graphs illustrating the gain of using turbo coding compared to convolutional coding for CQI/PMI at different payload sizes.
Figure 5B:
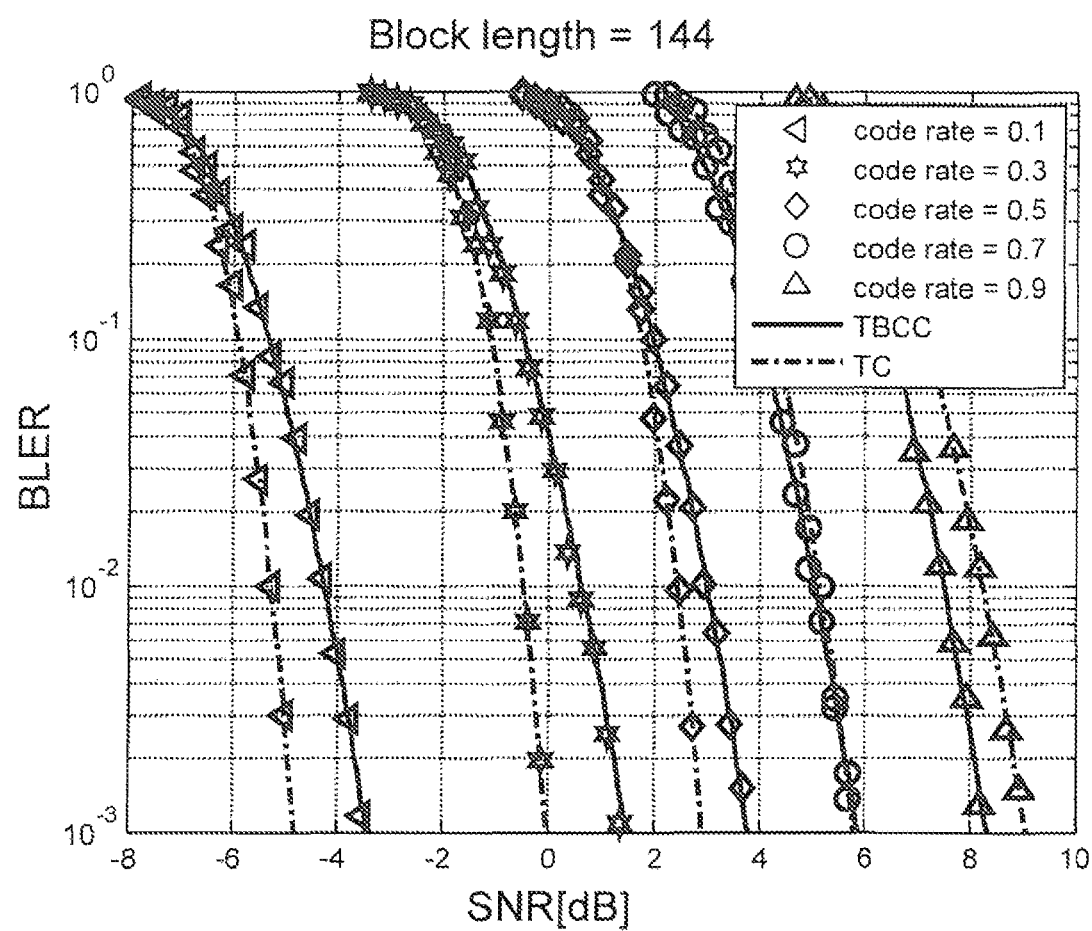
Figure 5C:
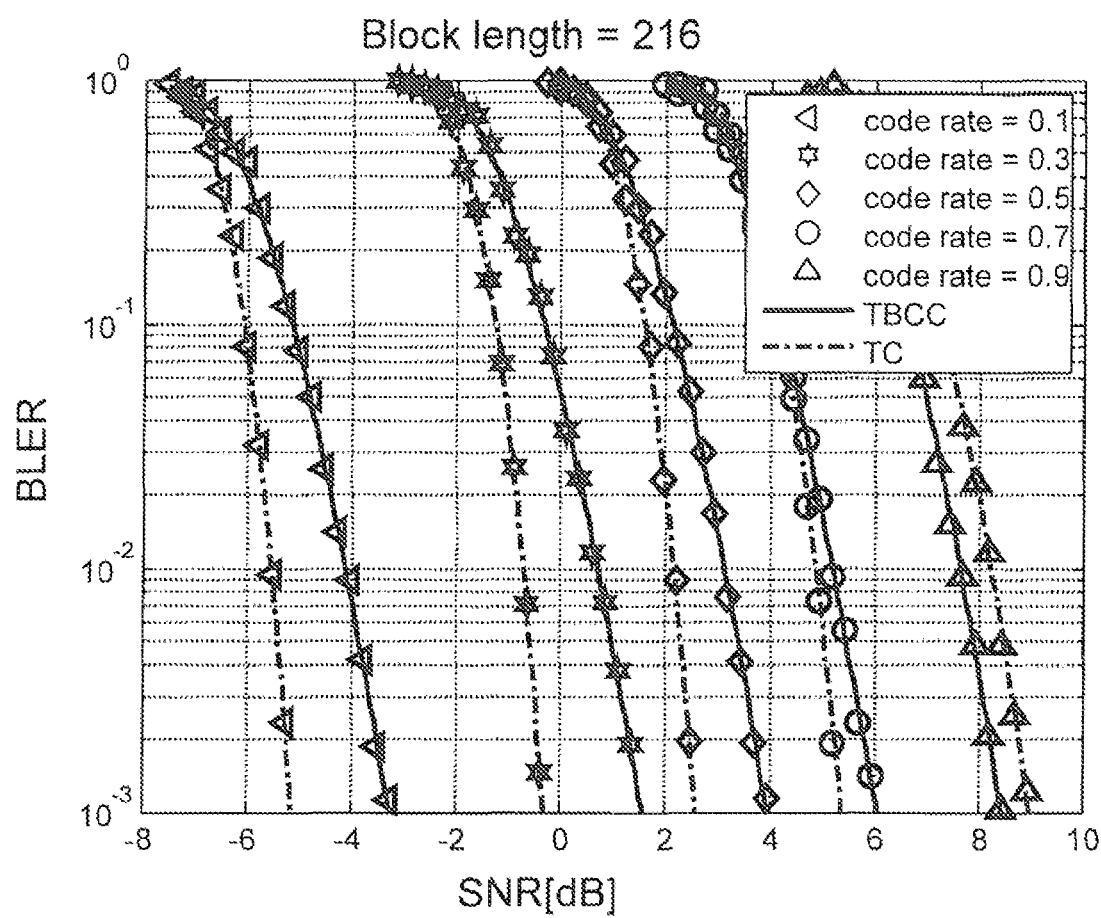
Figure 5D:
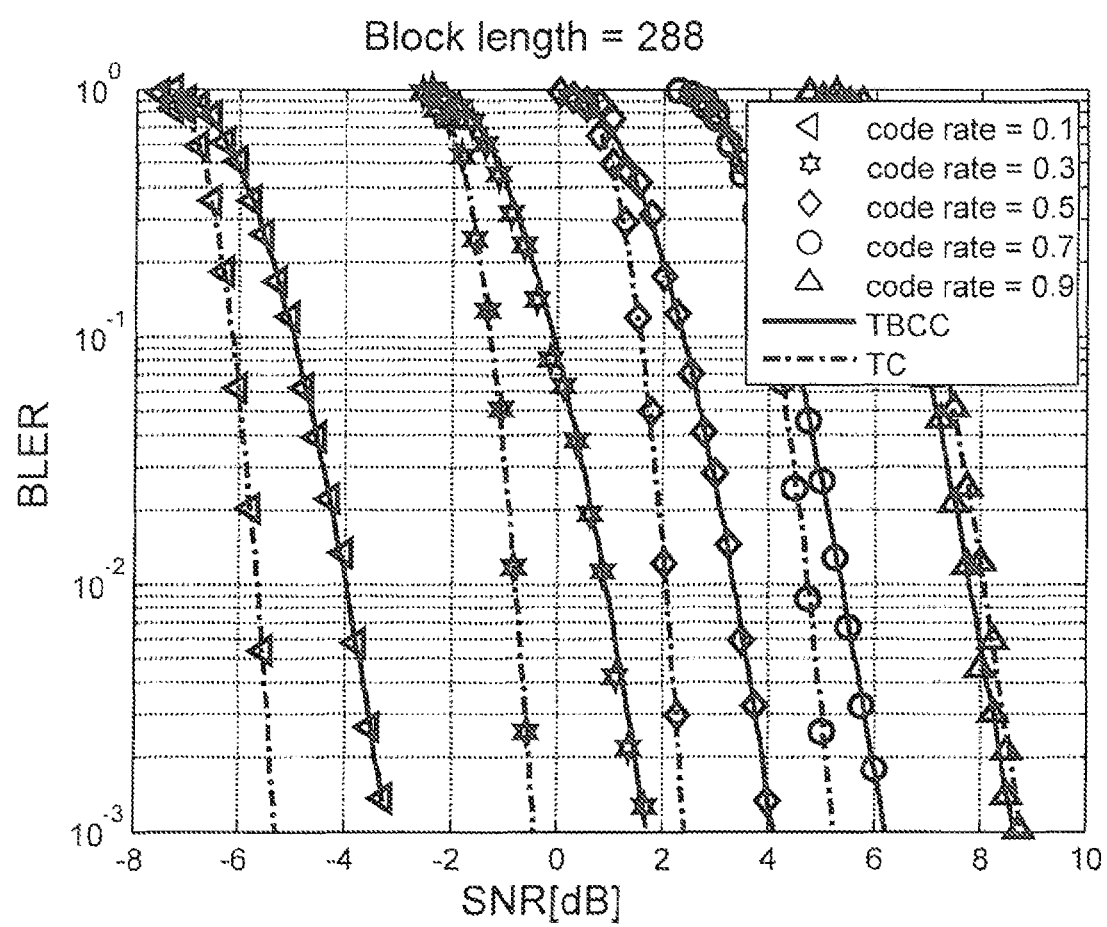
Figure 5E:
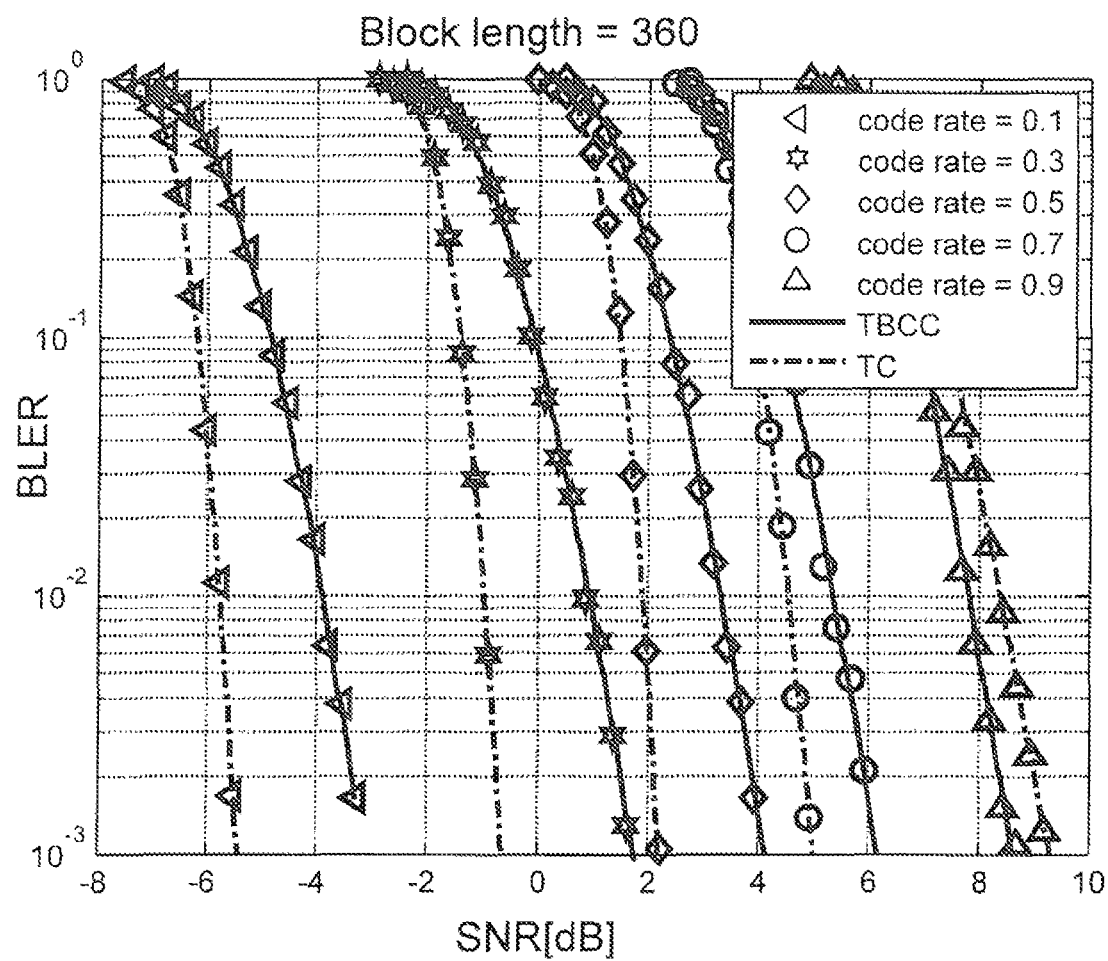

Embodiments are described in a non-limiting general context in relation to an example scenario in an advanced LTE network, such as the one illustrated in FIG. 1. However, it should be noted that the embodiments may also be applied to other types of radio access networks using a similar type of CSI reporting mechanism as the LTE system.

A study to determine if there is a gain of using turbo codes for CQI/PMI at large payload sizes has been performed. In the graphs of FIGS. 5a-e, simulation results are provided for Turbo Coding (TC) and Tail Biting Convolutional Coding (TBCC) with the sizes of 72, 144, 216, 288 and 360 bits. The simulations are performed with an Additive White Gaussian Noise (AWGN) channel and a summary of the results are also shown in Table 1 and Table 2 below. Table 1 summarizes the results for a Block Error Rate (BLER) of 1%. In Table 2 the BLER is 10%.

TABLE 1

| Gains of TC vs TBCC at BLER = 1% | | | | | |
|---|---|---|---|---|---|
| CSI Code | Payload size | | | | |
| Rate | 72 | 144 | 216 | 288 | 360 |
| 0.9 | −0.6 | −0.7 | −0.6 | −0.3 | −0.6 |
| 0.8 | −1.0 | −0.4 | −0.0 | 0.3 | 0.5 |
| 0.7 | −0.8 | −0.1 | 0.3 | 0.6 | 0.8 |
| 0.6 | −0.5 | 0.3 | 0.7 | 1.0 | 1.2 |
| 0.5 | −0.2 | 0.6 | 1.0 | 1.3 | 1.4 |
| 0.4 | 0.1 | 0.9 | 1.2 | 1.5 | 1.7 |
| 0.3 | 0.3 | 1.0 | 1.4 | 1.7 | 1.9 |
| 0.2 | 0.2 | 1.0 | 1.4 | 1.6 | 1.8 |
| 0.1 | 0.3 | 1.0 | 1.4 | 1.7 | 1.9 |

TABLE 2

| Gains of TC vs TBCC at BLER = 10% | | | | | |
|---|---|---|---|---|---|
| CSI Code | Payload size | | | | |
| Rate | 72 | 144 | 216 | 288 | 360 |
| 0.9 | −0.5 | −0.7 | −0.6 | −0.4 | −0.5 |
| 0.8 | −0.8 | −0.5 | −0.2 | 0.0 | 0.2 |
| 0.7 | −0.8 | −0.3 | −0.0 | 0.3 | 0.5 |
| 0.6 | −0.6 | 0.0 | 0.3 | 0.6 | 0.7 |
| 0.5 | −0.4 | 0.2 | 0.5 | 0.8 | 0.9 |
| 0.4 | −0.2 | 0.5 | 0.8 | 1.0 | 1.2 |
| 0.3 | −0.1 | 0.6 | 0.9 | 1.2 | 1.3 |
| 0.2 | −0.1 | 0.6 | 0.9 | 1.1 | 1.2 |
| 0.1 | −0.1 | 0.6 | 0.9 | 1.2 | 1.3 |

From Table 1 and Table 2, it can be seen that from somewhere between 150 and 200 bits payload size there is almost always a gain with the turbo code compared to the convolutional code, i.e. for in principle all code rates. In most cases the gain with the turbo code over the convolutional code is between 1 and 2 dB. The gain of turbo code over convolutional code may be utilized to set a lower beta factor or beta offset for the CQI/PMI transmission. Thereby it is possible to lower the overhead of the CQI/PMI reporting and thus to allow more UL-SCH data to be multiplexed together with the CQI/PMI information. One possible embodiment would be to set the threshold limit above which the turbo coding method should be applied to a value that corresponds to the highest CQI/PMI payload for two component carriers of a total of 40 MHz. This would set the switching point at 148 bits excluding the Cyclic Redundancy Check (CRC) part, which corresponds to a rank 2 CQI/PMI report with Transmission Mode 9 (TM9) in case of eight TX.

In case the turbo code is used to encode CQI/PMI, a similarity with the PUSCH data is wanted in order to reuse the PUSCH implementation as much as possible. Consequently it would be beneficial to apply one of the two CRC polynomials that are used for data on PUSCH. No retransmissions are supported with CQI/PMI so the redundancy version should be fixed to $rv_0$. Furthermore, the soft buffer size should be set in a similar way as for PUSCH, as well as the number of encoded bits.

The CQI/PMI reports from different component carriers or cells need to be ordered in some determined way. The simplest solution would be to order them in increasing order of cell index.

The problem of the increasing sizes of the CQI/PMI payload when carrier aggregation is introduced is thus addressed by a solution where turbo coding is introduced for the CQI/PMI report coding, as turbo codes may provide gains at large CQI/PMI payload sizes. However, as it is possible for the eNobeB to change between triggering aperiodic CSI for many downlink cells and triggering aperiodic CSI for only a single downlink cell on a sub frame basis, the CQI/PMI payload will vary from sub frame to sub frame, and the turbo code may not always be optimal. Therefore, what coding method to apply is dependent on the size of the payload, and the turbo coding method is only used when the size of the CQI/PMI information is above a threshold size.

In order to efficiently transmit the CQI/PMI information using different coding methods, separate beta offset values for the different coding methods used for the turbo coding method would be favorable, as mentioned above. As the conventionally used Beta offset value $\beta_{offset}^{CQI}$ for the UE is common for all coding methods applied for CQI/PMI, an offset value that is set based on the method applied for the channel coding is introduced.

In a first aspect, if turbo coding may be used to encode CQI/PMI information on PUSCH, a separate beta offset $\hat{\beta}_{offset}^{CQI}$ is introduced that is either of the following alternatives:
1. Only used for turbo codes, (beta_tc);
2. Only used for turbo codes and convolutional codes (beta_tc_cc); or
3. Only used for turbo codes and RM codes (beta_tc_rm).

The value of the beta offset would thus be set according to the following:
$\hat{\beta}_{offset}^{CQI}$=beta_tc when the turbo coding method is applied for channel coding the CQI/PMI information,
$\hat{\beta}_{offset}^{CQI}$=beta_tc_cc when turbo coding or convolution coding method is applied for channel coding the CQI/PMI information, or
$\hat{\beta}_{offset}^{CQI}$=beta_tc_rm when turbo coding or RM coding method is applied for channel coding the CQI/PMI information.

The value of the beta offset could be assigned depending on the relative performance difference of the used coding methods or each used set of coding methods.

If a specific beta offset $\hat{\beta}_{offset}^{CQI}$ is introduced for alternatives 1 through 3 above, separate beta offset values may also need to be defined for the usage of RM code only (beta_rm), convolutional code only (beta_cc), and/or RM code & convolutional code (beta_rm_cc). The value of the beta offset would then be set depending on the used coding method according to the following:
$\hat{\beta}_{offset}^{CQI}$=beta_rm_cc when RM coding or convolution coding method is applied for channel coding the CQI/PMI information,
$\hat{\beta}_{offset}^{CQI}$=beta_rm when the RM coding method is applied for channel coding the CQI/PMI information, or
$\hat{\beta}_{offset}^{CQI}$=beta_cc when convolution coding method is applied for channel coding the CQI/PMI information.

As a special case, the beta offset $\hat{\beta}_{offset}^{CQI}$ can also be common for all coding methods, i.e. for turbo coding, convolutional code and RM code, i.e. $\hat{\beta}_{offset}^{CQI}$=beta_tc_rm_cc.

The $\hat{\beta}_{offset}^{CQI}$ parameter can be incorporated in the formula [1] to assign the number of CQI/PMI resources, as follows:

$$Q' = \min\left(\left\lceil \frac{(O+L) \cdot M_{sc}^{PUSCH-initial} \cdot \beta_{offset}^{PUSCH}}{N_{symb}^{PUSCH-initial} \cdot \sum_{r=0}^{C^{(x)}-1} K_r^{(x)}} \right\rceil, M_{sc}^{PUSCH} \cdot N_{symb}^{PUSCH} - \frac{Q_{RI}}{Q_m}\right) \quad [1]$$

where $\beta_{offset}^{PUSCH}=\hat{\beta}_{offset}^{CQI}$, $M_{sc}^{PUSCH-initial}$ correspond to the scheduled bandwidth expressed in subcarriers for the initial transmission, $M_{sc}^{PUSCH-initial}$ correspond to the scheduled bandwidth expressed in subcarriers, $N_{symb}^{PUSCH-initial}$ corresponds to the number of Single-Carrier Frequency-Division Multiple Access (SC-FDMA) symbols in an uplink slot allocated to the PUSCH for the initial transmission, $N_{symb}^{PUSCH}$ corresponds to the number of SC-FDMA symbols in an uplink slot allocated to the PUSCH, C is the number of code block used to encode the data, $K_r^{(x)}$ is the number of bits in the r:th code block, O is the number of CQI/PMI bits, $Q_m$ is the modulation order where $Q_m$=2 for QPSK, $Q_m$=4 for 16QAM and $Q_m$=6 for 64QAM, $Q_{IR}$ is the number of RI bits, L is the number of CRC bits and Q' is the number of resource elements occupied by CQI/PMI. The number of coded CQI/PMI bits is derived by $Q_{CQI}=Q_m \cdot Q''$.

It is emphasized that, in one embodiment of this first aspect, the $\hat{\beta}_{offset}^{CQI}$ parameter can be set to one. This is derived from the analysis that the same code rate can be applied to both PUSCH data and CQI/PMI feedback when turbo coding is used for both. Therefore, the calculation of the number of coded CQI/PMI bits can be simplified by not requiring the beta offset value when turbo coding is used for CQI/PMI feedback, and formula [1] is simplified into:

$$Q' = \min\left(\left\lceil \frac{(O+L) \cdot M_{sc}^{PUSCH-initial}}{N_{symb}^{PUSCH-initial} \cdot \sum_{r=0}^{C^{(x)}-1} K_r^{(x)}} \right\rceil, M_{sc}^{PUSCH} \cdot N_{symb}^{PUSCH} - \frac{Q_{RI}}{Q_m}\right) \quad [2]$$

According to a second aspect, a specific gain factor G is introduced in case turbo coding is used to encode CQI/PMI information. The gain factor G will then determine the gain of turbo code over convolutional code and/or RM code. As an example, the gain factor G may be configured based on analysis or computer simulations. In another embodiment, the gain factor is set as $$G = \frac{\hat{\beta}_{offset}^{CQI}}{\beta_{offset}^{CQI}}$$

using the values of $\hat{\beta}_{offset}^{CQI}$ as defined in the first aspect of the invention.

The gain factor can be incorporated for example by introducing the parameter G in the resource allocation formula [1] as follows:

$$Q' = \min\left(\left\lceil G \frac{(O+L) \cdot M_{sc}^{PUSCH-initial} \cdot \beta_{offset}^{PUSCH}}{N_{symb}^{PUSCH-initial} \cdot \sum_{r=0}^{C^{(x)}-1} K_r^{(x)}} \right\rceil, M_{sc}^{PUSCH} \cdot N_{symb}^{PUSCH} - \frac{Q_{RI}}{Q_m}\right) \quad [3]$$

where $\beta_{offset}^{PUSCH}=\hat{\beta}_{offset}^{CQI}$ where $\beta_{offset}^{CQI}$ is the beta factor used at least for turbo coding, $M_{sc}^{PUSCH-initial}$ correspond to the scheduled bandwidth expressed in subcarriers for the initial transmission, $M_{sc}^{PUSCH}$ correspond to the scheduled bandwidth expressed in subcarriers, $N_{symb}^{PUSCH-initial}$ corresponds to the number of SC-FDMA symbols in an uplink slot allocated to the PUSCH for the initial transmission, $N_{symb}^{PUSCH}$ corresponds to the number of SC-FDMA symbols in an uplink slot allocated to the PUSCH, C is the number of code block used to encode the data, $K_r^{(x)}$ is the number of bits in the r:th code block, O is the number of CQI/PMI bits, $Q_m$ is the modulation order where $Q_m=2$ for QPSK, $Q_m=4$ for 16QAM and $Q_m=6$ for 64QAM, $Q_{RI}$ is the number of RI bits, L is the number of CRC bits and Q' is the number of resource elements occupied by CQI/PMI. The number of coded CQI/PMI bits is derived by $Q_{CQI}=Q_m \cdot Q'$.

An advantageous embodiment based on this second aspect is to define a gain factor G that is dependent of the CQI/PMI feedback size. The CQI/PMI feedback size may also include the CRC length. In this embodiment, the same $\beta_{offset}^{CQI}$ values defined in existing standards can be reused. The impact of different channel coding approaches for the CQI/PMI feedback is determined by the gain factor function $G(O+L)$. The resource allocation formula [1] becomes:

$$Q' = \min\left(\left\lceil G(O+L) \frac{(O+L) \cdot M_{sc}^{PUSCH-initial} \cdot \beta_{offset}^{PUSCH}}{\sum_{r=0}^{C^{(x)}-1} K_r^{(x)}}\right\rceil, M_{sc}^{PUSCH} \cdot N_{symb}^{PUSCH} - \frac{Q_{RI}}{Q_m}\right) \quad [4]$$

As non-limiting examples, the gain factor function $G(O+L)$ may be implemented as:
1. A look-up table;
2. A piece-wise constant, such as a step function; or
3. A linear function.

In a further embodiment, the gain factor function may take the existing $\beta_{offset}^{CQI}$ value into consideration: $G(O+L, \beta_{offset}^{CQI})$. One non-limiting example is that $G(O+L, \beta_{offset}^{CQI})=1/\beta_{offset}^{CQI}$ if $O+L$ is greater than a threshold, e.g. when turbo coding is applied, and $G(O+L, \beta_{offset}^{CQI})=1$ otherwise, e.g. when convolutional coding is used. The threshold may thus be the same as the threshold for when turbo coding is applied described above. The result will be the same as in the example described above with reference to formula [2] above, i.e. that the same code rate can be applied to both PUSCH data and CQI/PMI feedback when turbo coding is used for both.

In order to provide a complete picture, the RI bit reporting is addressed hereinafter. Rel-10 supports up to eight layers transmission in downlink per component carrier. This results in that the total number of reportable RI bits are 15, assuming that no bundling of the RI bits is considered. For coding of rank and ACK/NACK it has been agreed in the 3GPP specifications that in case of 3-11 bits the RM code should be utilized and incase of 12-15 bits the dual RM code should be utilized. There has however not been any agreement on the exact number of reported RI bits in case of carrier aggregation. Two main reporting principles are possible. The first is that the full range of RI bits is reported and the second is that some form of bundling of RI bits is introduced. For ACK/NACK bits full ACK/NACK bit multiplexing is supported in FDD and TDD, supporting reporting up to 20 ACK/NACK bits. Given that ACK/NACK supports reporting bits in the range of up to 20 bits, it seems natural to support RI reporting up to 15 bits. It is therefore proposed that up to three bits of RI may be reported per component carrier, and that no bundling of the RI bits is performed.

If multiple RI reports are reported in the same PUSCH transmission they need to be ordered in a pre-determined manner so that the eNB and UE has the same understanding. It is proposed that the RI should be ordered based on increasing cell index, similarly to how the ACK/NACK bits for PUCCH format 3 is ordered.

Figure 6:
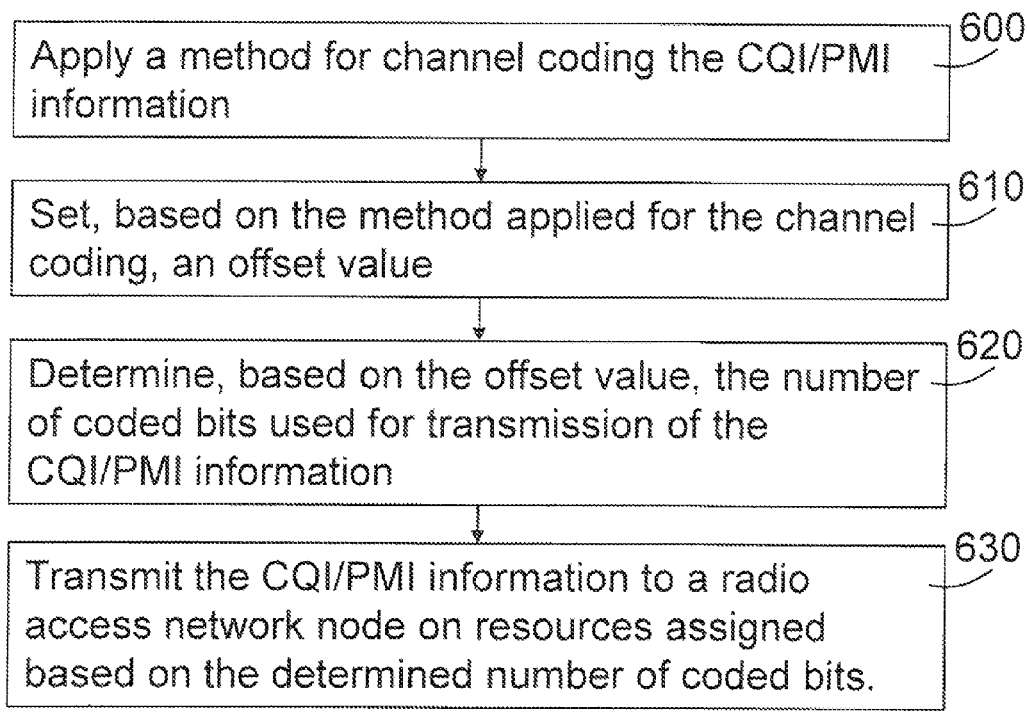
FIG. 6 is a flowchart illustrating the method in a UE according to embodiments.

FIG. 6 is a flowchart illustrating a method for use in a UE of a communications system, for transmitting information relating to CQI and PMI, multiplexed with UL-SCH data information on a PUSCH. The method comprises:
- 600: Applying a method for channel coding the CQI/PMI information, wherein a turbo coding method is applied when the size of the CQI/PMI information is above a first threshold value. As already described above, a threshold value of 148 bits may be suitable. When the size of CQI/PMI is above 148 bits, the turbo coding method is applied.
- 610: Setting, based on the method applied for the channel coding, an offset value indicative of the difference in code rate between the code rate of the CQI/PMI information and the assigned code rate of the UL-SCH data information on the PUSCH.
- 620: Determining, based on the offset value, the number of coded bits to be used for transmission of the CQI/PMI information.
- 630: Transmitting the CQI/PMI information to a radio access network node on resources assigned based on the determined number of coded bits.

In accordance with the first aspect described above, the number of coded bits to be used for transmission of the CQI/PMI information is determined based on a resource allocation formula comprising the set offset value. The set offset value thus replaces a fixed beta offset value conventionally used in the formula. The resource allocation formula is given in [1] above, where $\beta_{offset}^{PUSCH}=\hat{\beta}_{offset}^{CQI}$, i.e. the fixed beta offset value is replaced by the set offset value. The offset value may for example be set to the beta_tc when turbo coding is used, as described above, and this set offset value is used in the resource allocation formula [1].

In accordance with the second aspect described above, the offset value corresponds to a gain factor value determining a gain of the applied channel coding method over a default channel coding method. The applied channel coding may e.g. be the turbo coding method, and the default may be the convolutional coding method. The number of coded bits to be used for transmission of the CQI/PMI information may be determined based on a resource allocation formula comprising the gain factor, as shown in [3] above.

In one embodiment, the gain factor value is set based on the size of the CQI/PMI information. The size of the CQI/PMI information may comprise the size of the CRC, thus corresponding to O+L used above. The gain factor value may be set based on one of the following: a look-up table; a piece-wise constant function; or a linear function.

The gain factor value may be set based on a beta offset value. According to one embodiment, the gain factor value is equal to an inverse of the beta offset value when the size of the CQI/PMI information is above a second threshold value, and is equal to the value one otherwise. If the second threshold value is chosen to be equal to the first threshold value used for determining when to apply the turbo coding method, the effect of this is the same as the effect described above with reference to [2].

Figure 7:
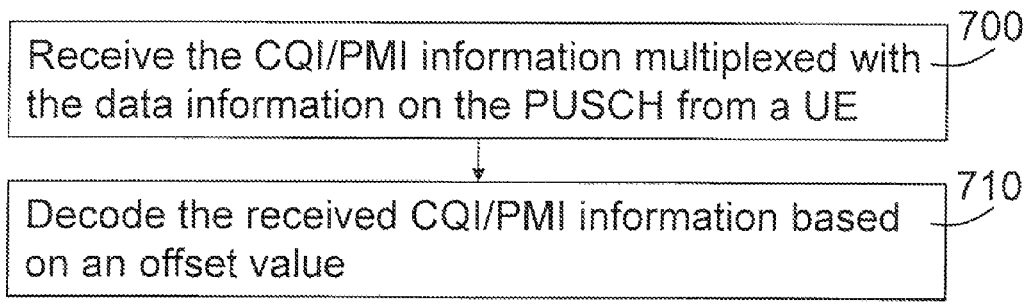
FIG. 7 is a flowchart illustrating the method in a RAN node according to embodiments.

FIG. 7 is a flowchart illustrating a method for use in a RAN node of a communications system, for receiving CQI and PMI information multiplexed with UL-SCH data information on a PUSCH. The method comprises:
- 700: Receiving the CQI/PMI information multiplexed with the UL-SCH data information on the PUSCH from a UE.
- 710: Decoding the received CQI/PMI information based on an offset value indicative of a difference in code rate between the code rate of the CQI/PMI information and the assigned code rate of the UL-SCH data information on the PUSCH.

Here, the RAN node uses the offset value for decoding the CQI/PMI information received from the UE.

Figure 8A:
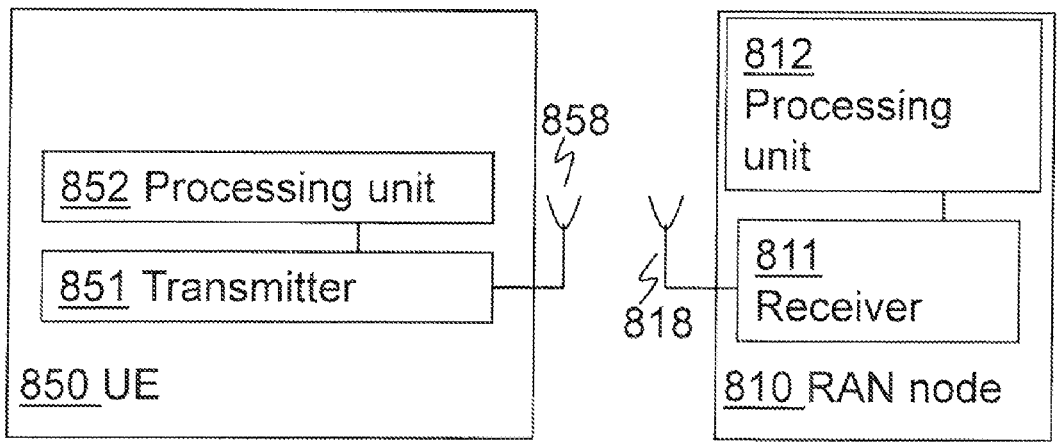
FIGS. 8a-b are block diagrams schematically illustrating a UE and a RAN node according to embodiments.

An embodiment of a UE 850 for a communications system, configured to transmit information relating to CQI and PMI multiplexed with UL-SCH data information on a PUSCH, is schematically illustrated in the block diagram in FIG. 8*a*. The UE 850 comprises a processing unit 852 configured to apply a method for channel coding the CQI/PMI information, wherein a turbo coding method is applied when the size of the CQI/PMI information is above a first threshold value. The processing unit 852 is also configured to set, based on the method applied for the channel coding, an offset value indicative of the difference in code rate between the code rate of the CQI/PMI information and the assigned code rate of the UL-SCH data information on the PUSCH. Furthermore, the processing unit 852 is configured to determine, based on the offset value, the number of coded bits to be used for transmission of the CQI/PMI information. The UE also comprises a transmitter 851 for transmitting the CQI/PMI information to a RAN node 810 on resources assigned based on the determined number of coded bits. One or more antennas 858 may be used for the transmission.

In embodiments according to the first aspect described above, the processing unit is configured to determine the number of coded bits to be used for transmission of the CQI/PMI information based on a resource allocation formula comprises the set offset value, which thus replaces the conventionally used fixed beta offset value.

In embodiments according to the second aspect described above, the offset value corresponds to a gain factor value determining a gain of the applied channel coding method over a default channel coding method. The processing unit 852 may be configured to determine the number of coded bits to be used for transmission of the CQI/PMI information based on a resource allocation formula comprising the gain factor. Furthermore, the processing unit 852 may be configured to set the gain factor value based on the size of the CQI/PMI information. In one embodiment, the size of the CQI/PMI information comprises the size of the CRC. Further, the processing unit may be configured to set the gain factor value based on one of the following: a look-up table; a piece-wise constant function; a linear function.

In another embodiment, the processing unit is configured to set the gain factor value based on a beta offset value. The gain factor value may be equal to an inverse of the beta offset value when the size of the CQI/PMI information is above a second threshold value, and equal to the value one otherwise.

An embodiment of a RAN node 810 of a communications system, is also illustrated in the block diagram in FIG. 8*a*. The RAN node 810 is configured to receive CQI and PMI information multiplexed with UL-SCH data information on a PUSCH. The RAN node 810 comprises a receiver 811 for receiving the CQI/PMI information multiplexed with the data information on the PUSCH from the UE 850. The receiver is connected to one or more antennas 818 for receiving the CQI/PMI information. The RAN node 810 also comprises a processing unit 812 configured to decode the received CQI/PMI information based on an offset value indicative of a difference in code rate between the code rate of the CQI/PMI information and the assigned code rate of the UL-SCH data information on the PUSCH.

The units described above with reference to FIG. 8*a* may be logical units, separate physical units or a combination of both logical and physical units.

Figure 8B:
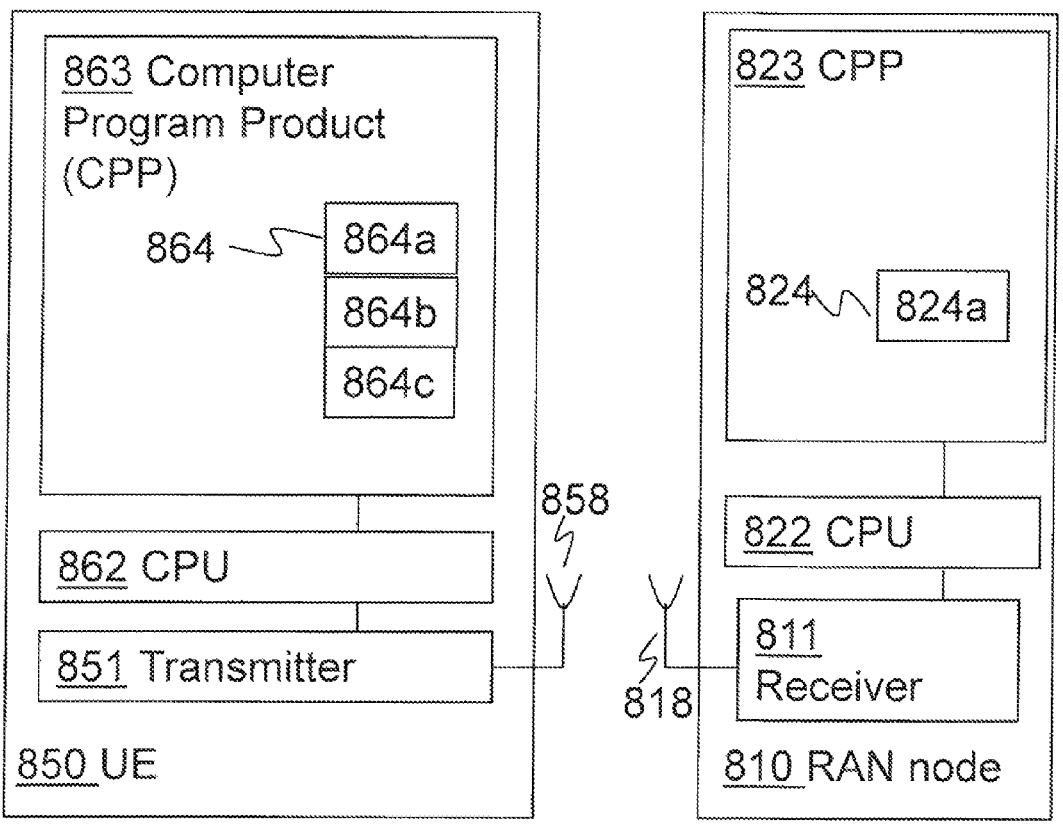

FIG. 8*b* schematically illustrates an embodiment of the UE 850 and the RAN node 810, which is an alternative way of disclosing the embodiment illustrated in FIG. 8*a*. The UE 850 comprises a transmitter 851 connected to an antenna 858 via an antenna port, as already described above with reference to FIG. 8*a*. The UE 850 also comprises a Central Processing Unit (CPU) 862 which may be a single unit or a plurality of units. Furthermore, the UE 850 comprises at least one computer program product (CPP) 863 in the form of a non-volatile memory, e.g. an EEPROM (Electrically Erasable Programmable Read-Only Memory), a flash memory or a disk drive. The CPP 863 comprises a computer program 864, which comprises code means which when run on the UE 850 causes the CPU 862 on the UE 850 to perform steps of the procedure described earlier in conjunction with FIG. 6.

In the embodiment described, the code means in the computer program 864 of the UE 850 comprises a module 864*a* for applying a method for channel coding the CQI/PMI information, a module 864*b* for setting an offset value, and a module 864*c* for determining the number of coded bits to be used for transmission of the CQI/PMI information. The code means may thus be implemented as computer program code structured in computer program modules. The modules 864*a*-*c* essentially perform the steps 600, 610, and 620 of the flow in FIG. 6 to emulate the UE illustrated in FIG. 8*a*. In other words, when the modules 864*a*-*c* are run on the CPU 862, they correspond to the processing unit 852 of FIG. 8*a*.

The RAN node 810 comprises a receiver 811 connected to an antenna 818 via an antenna port, as already described above with reference to FIG. 8*a*. The RAN node 810 also comprises a Central Processing Unit (CPU) 822 which may be a single unit or a plurality of units. Furthermore, the RAN node 810 comprises at least one CPP 823 in the form of a non-volatile memory, e.g. an EEPROM, a flash memory, or a disk drive. The CPP 823 comprises a computer program 824, which comprises code means which when run on the RAN node 810 causes the CPU 822 on the RAN node 810 to perform steps of the procedure described earlier in conjunction with FIG. 7.

In the embodiment described, the code means in the computer program 824 of the RAN node 810 comprises a module 824*a* for decoding the received CQI/PMI information based on the offset value. The code means may thus be implemented as computer program code structured in computer program modules. The module 824*a* essentially performs the step 710 of the flow in FIG. 7 to emulate the RAN node illustrated in FIG. 8*a*. In other words, when the module 824*a* is run on the CPU 822, it corresponds to the processing unit 812 of FIG. 8*a*.

Although the code means in the embodiment disclosed above in conjunction with FIG. 8*b* are implemented as computer program modules, they may in alternative embodiments be implemented at least partly as hardware circuits.

Figure 9A:
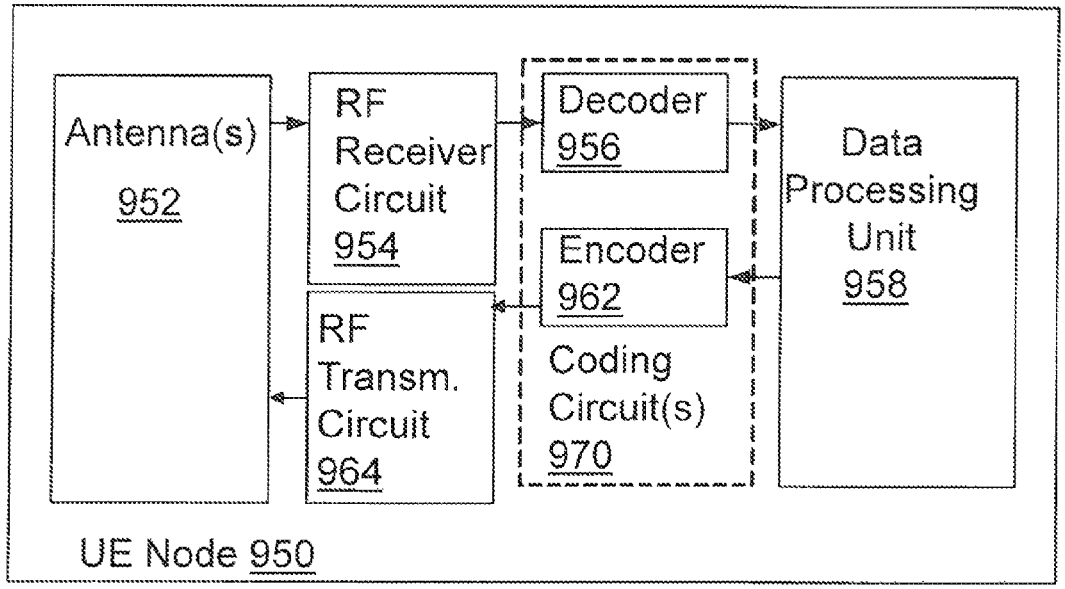
FIGS. 9a-b are block diagrams schematically illustrating a UE and a RAN node according to embodiments.
Figure 9B:
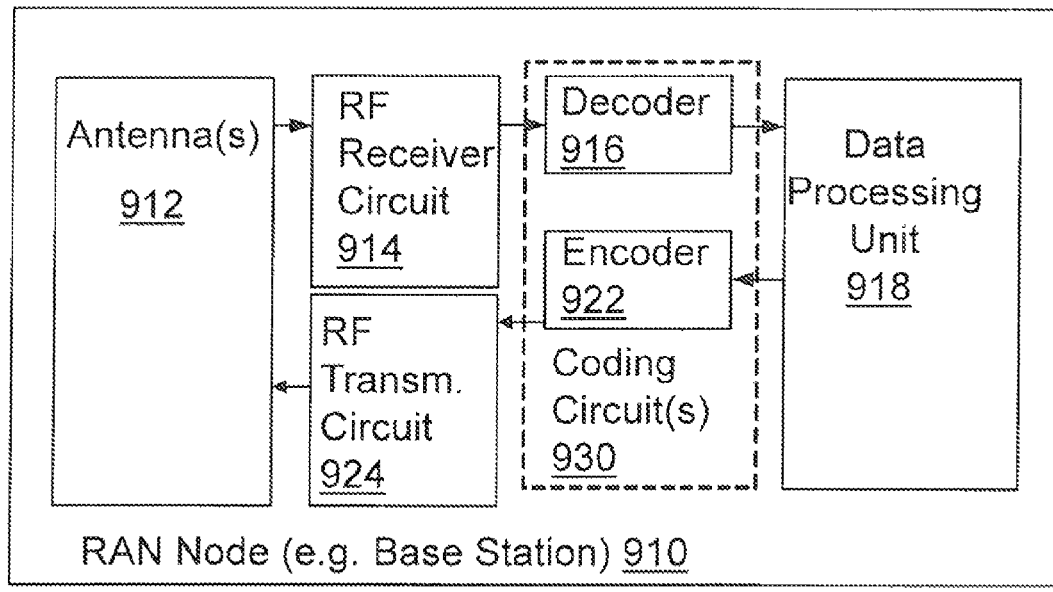

FIGS. 9*a* and 9*b* schematically illustrate embodiments of a UE 950 and a RAN node 910 respectively. FIG. 9*a* is a block diagram of a UE 950 which is configured to operate according to one or more embodiments disclosed herein.

The UE 950 includes one or more antennas 952, a RF receiver circuit 954, a coding circuit 970, a data processor 958, and a RF transmitter circuit 964. The coding circuit 970 includes a decoder 956 that decodes information (data) received from another communication device (e.g., a RAN node) via the antenna(s) 952 and RF receiver circuit 954 according to at least one embodiment disclosed herein. The coding circuit 970 also includes an encoder 962 that encodes information for transmission to another communication device (e.g., a RAN node) via the RF transmitter circuit 964 and the antenna(s) 952 according to at least one embodiment disclosed herein. The data processor 958 may be configured to carry out functionality according to at least one embodiment disclosed herein. The coding circuit 970 and the data processor 958 may be combined, and may include one or more data processing circuits, such as a general purpose and/or special purpose processor (e.g., microprocessor and/or digital signal processor) with on-board and/or separate memory device(s). The coding circuit 970 and data processor 958 are configured to execute computer program instructions from the memory device(s), described below as a computer readable medium, to perform at least some of the operations and methods disclosed herein.

FIG. 9b is a block diagram of a RAN node 910 which is configured to operate according to one or more embodiments disclosed herein. The RAN node 910 includes one or more antennas 912, a RF receiver circuit 914, a coding circuit 930, a data processor 918, and a RF transmitter circuit 924. The coding circuit 930 includes a decoder 916 that decodes information (data) received from another communication device (e.g., a UE node) via the antenna(s) 912 and RF receiver circuit 914 according to at least one embodiment disclosed herein. The coding circuit 930 also includes an encoder 922 that encodes information for transmission to another communication device (e.g., a UE) via the RF transmitter circuit 924 and the antenna(s) 912 according to at least one embodiment disclosed herein. The data processor 918 may be configured to use the received information to carry out various functionality of the radio access network node 918 according to at least one embodiment disclosed herein. The coding circuit 930 and the data processor 918 may be combined, and may include one or more data processing circuits, such as a general purpose and/or special purpose processor (e.g., microprocessor and/or digital signal processor) with on-board and/or separate memory device(s). The coding circuit 930 and the data processor 918 are configured to execute computer program instructions from the memory device(s), described below as a computer readable medium, to perform at least some of the operations and methods disclosed herein.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method for use in a user equipment of a communications system, for transmitting information relating to channel quality Index (CQI) and precoding matrix index (PMI) multiplexed with uplink shared channel (UL-SCH) data information on a physical uplink shared channel (PUSCH), the method comprising:
    applying a method for channel coding CQI/PMI information, wherein a turbo coding method is applied when a size of the CQI/PMI information is above a first threshold value;
    setting based on the method applied for the channel coding, an offset value indicative of a difference in code rate between a code rate of the CQI/PMI information and an assigned code rate of the UL-SCH data information on the PUSCH;
    determining based on the offset value, the number of coded bits to be used for transmission of the CQI/PMI information; and
    transmitting the CQI/PMI information to a radio access network node on resources assigned based on the determined number of coded bits,
    wherein the offset value corresponds to a gain factor value determining a gain of the applied channel coding method over a default channel coding method; and
    wherein the applying, setting, determining and transmitting are performed by the user equipment.

2. The method of claim 1, wherein the number of coded bits to be used for transmission of the CQI/PMI information is determined based on a resource allocation formula comprising the gain factor.

3. The method of claim 1, wherein the gain factor value is set based on the size of the CQI/PMI information.

4. The method of claim 3, wherein the size of the CQI/PMI information comprises the size of the cyclic redundancy check (CRC).

5. The method of claim 3, wherein the gain factor value is set based on one of a look-up table; a piece-wise constant function; and a linear function.

6. The method of claim 3, wherein the gain factor value is set based on a beta offset value.

7. The method of claim 6, wherein the gain factor value:
    is equal to an inverse of the beta offset value when the size of the CQI/PMI information is above a second threshold value; and
    is equal to one when the size of the CQI/PMI information is not above the second threshold value.

8. The method of claim 1, wherein the number of coded bits to be used for transmission of the CQI/PMI information is determined based on a resource allocation formula comprising the set offset value.

9. A user equipment for a communications system, configured to transmit information relating to channel quality index (CQI) and precoding matrix index (PMI) multiplexed with uplink shared channel (UL-SCH) data information on a physical uplink shared channel (PUSCH), the user equipment comprising a processing unit configured to:
    apply a method for channel coding CQI/PMI information, wherein a turbo coding method is applied when a size of the CQI/PMI information is above a first threshold value;
    set, based on the method applied for the channel coding, an offset value indicative of a difference in code rate between a code rate of the CQI/PMI information and an assigned code rate of the UL-SCH data information on the PUSCH; and
    determine, based on the offset value, the number of coded bits to be used for transmission of the CQI/PMI information; and
    a transmitter for transmitting the CQI/PMI information to a radio access network node on resources assigned based on the determined number of coded bits,
    wherein the processing unit is positioned in the user equipment; and
    wherein the offset value corresponds to a gain factor value determining a gain of the applied channel coding method over a default channel coding method.

10. The user equipment of claim 9, wherein the processing unit is configured to determine the number of coded bits to be used for transmission of the CQI/PMI information based on a resource allocation formula comprising the gain factor.

11. The user equipment of claim 9, wherein the processing unit is configured to set the gain factor value based on the size of the CQI/PMI information.

12. The user equipment of claim 11, wherein the size of the CQI/PMI information comprises the size of the cyclic redundancy check (CRC).

13. The user equipment of claim 11, wherein the processing unit is configured to set the gain factor value based on one of a look-up table; a piece-wise constant function; and a linear function.

14. The user equipment of claim 11, wherein the processing unit is configured to set the gain factor value based on a beta offset value.

15. The user equipment of claim 14, wherein the gain factor value:
- is equal to an inverse of the beta offset value when the size of the CQI/PMI information is above a second threshold value; and
- is equal to one when the size of the CQI/PMI information is not above the second threshold value.

16. The user equipment of claim 9, wherein the processing unit is configured to determine the number of coded bits to be used for transmission of the CQI/PMI information based on a resource allocation formula comprising the set offset value.

* * * * *